(12) United States Patent
Nelson et al.

(10) Patent No.: US 8,714,521 B2
(45) Date of Patent: May 6, 2014

(54) BUTTERFLY VALVE, VALVE SEAT AND VALVE SEAT RETAINER

(75) Inventors: Michael P. Nelson, Lehi, UT (US); Laren J. Winkel, Highland, UT (US)

(73) Assignee: Flowserve Management Company, Irving, TX (US)

( * ) Notice: Subject to any disclaimer, the term of this patent is extended or adjusted under 35 U.S.C. 154(b) by 461 days.

(21) Appl. No.: 13/001,367

(22) PCT Filed: Jun. 26, 2008

(86) PCT No.: PCT/US2008/068429
§ 371 (c)(1),
(2), (4) Date: Feb. 2, 2011

(87) PCT Pub. No.: WO2009/157940
PCT Pub. Date: Dec. 30, 2009

(65) Prior Publication Data
US 2011/0114863 A1    May 19, 2011

(51) Int. Cl.
*F16K 1/22* (2006.01)
(52) U.S. Cl.
USPC ............ 251/306; 251/314; 251/173; 277/644
(58) Field of Classification Search
USPC ........... 251/314, 305, 306, 173, 174; 277/644
See application file for complete search history.

(56) References Cited

U.S. PATENT DOCUMENTS

| | | | | |
|---|---|---|---|---|
| 3,156,445 A | * | 11/1964 | Swain | 251/171 |
| 3,204,924 A | * | 9/1965 | Bredtschneider | 251/174 |
| 3,650,508 A | * | 3/1972 | Kosmala et al. | 251/174 |
| 3,734,457 A | * | 5/1973 | Roos | 251/173 |
| 3,771,764 A | | 11/1973 | Miyauchi | |
| 3,940,108 A | | 2/1976 | Edwards | |
| 4,114,856 A | | 9/1978 | MacAfee et al. | |
| 4,120,482 A | * | 10/1978 | Cox | 251/306 |
| 4,202,365 A | | 5/1980 | Aoki et al. | |
| 4,228,816 A | | 10/1980 | Aoki | |
| 4,331,319 A | * | 5/1982 | Summers et al. | 251/173 |
| 4,487,216 A | * | 12/1984 | Barker et al. | 137/74 |
| 4,505,290 A | * | 3/1985 | Scobie | 137/74 |
| 4,513,765 A | * | 4/1985 | Rishovd et al. | 137/72 |
| 4,513,946 A | * | 4/1985 | Priese | 251/173 |
| RE32,264 E | | 10/1986 | Bonafous | |
| 4,623,121 A | * | 11/1986 | Donnelly | 251/306 |
| 4,766,927 A | * | 8/1988 | Conatser | 137/315.27 |

(Continued)

FOREIGN PATENT DOCUMENTS

| | | |
|---|---|---|
| EP | 0298896 | 1/1989 |
| GB | 2061462 | 5/1981 |

(Continued)

OTHER PUBLICATIONS

Extended European Search Report for European Patent Application EP11158542, dated Aug. 4, 2011, 8 pages.

(Continued)

*Primary Examiner* — John K Fristoe, Jr.
*Assistant Examiner* — Marina Tietjen
(74) *Attorney, Agent, or Firm* — TraskBritt

(57) ABSTRACT

Butterfly valves comprise a valve seat comprising a generally S-shaped cross-section and a valve seat retainer configured with appropriately shaped cooperating surfaces. Fluid control systems comprising such a butterfly valve are also disclosed.

11 Claims, 4 Drawing Sheets

(56) References Cited

U.S. PATENT DOCUMENTS

| | | | |
|---|---|---|---|
| 4,805,874 | A | 2/1989 | Miyake et al. |
| 4,817,916 | A | 4/1989 | Rawstrom |
| 5,201,644 | A | 4/1993 | Henriksen |
| 2005/0224031 | A1 | 10/2005 | Knight et al. |
| 2010/0108931 | A1* | 5/2010 | Dalluge et al. ............... 251/305 |

FOREIGN PATENT DOCUMENTS

| | | |
|---|---|---|
| GB | 2071281 | 9/1981 |
| JP | 55010104 | 1/1980 |
| JP | 2007170616 | 7/2007 |

OTHER PUBLICATIONS

Extended European Search Report for European Patent Application EP08781047.9, dated Aug. 4, 2011, 6 pages.

Wafer-Sphere High Performance Butterfly Valves, metso automation, 2003, 6 pages.

International Search Report for International Application PCT/US08/068429, Oct. 10, 2008, 2 pages.

Written Opinion of the International Searching Authority for International Application PCT/US08/068429, Oct. 10, 2008.

* cited by examiner

BUTTERFLY VALVE, VALVE SEAT AND VALVE SEAT RETAINER

PRIORITY CLAIM

This is a national phase entry under 35 U.S.C. §371 of International Patent Application PCT/US2008/068429, filed Jun. 26, 2008, published in English as International Patent Publication WO 2009/157940 A1 on Dec. 30, 2009, the entire disclosure of which is hereby incorporated herein by this reference.

TECHNICAL FIELD

The present invention relates generally to butterfly valves, and, more particularly, to an annular valve seat and valve seat assembly.

BACKGROUND

Butterfly valves, in general, are well known and widely employed due to their simplicity of construction and relatively inexpensive cost, as compared to more complicated and detailed plug and ball valves. A typical butterfly valve generally comprises a disc mounted for rotation between the open position, in which the disc lies substantially parallel to the axis of the fluid flow channel through the valve, and the closed position, in which the disc lies perpendicularly to this axis. The disc is mounted for rotation on a valve stem or shaft, which is attached to the disc on one side. The disc cooperates with an annular flexible seat circumscribing the fluid flow channel for the purpose of effecting a resilient seal against the disc to shut off fluid flow through the channel. The annular flexible seat is conventionally held in position by being clamped in a recess formed between complementary surfaces of a portion of the valve body and a valve seat retainer.

The need for a certain degree of resilience and, thus, displaceability of the valve seat necessitates the use of an elastomeric material. If thermal or fluid pressure stresses cause distortions to the valve seat that could inhibit complete sealing, the elastomeric material is capable of distorting, so as to deform into the shape of the peripheral surface of the disc and establish a seal. However, materials of this type have a tendency to creep or migrate when subjected to high pressure, particularly when the pressure is applied to the seat on one side of the disc without a corresponding supporting pressure on the other side of the disc. Some conventional valve seats incorporate a reinforcing member in the seat in order to control this migration or creep without sacrificing the necessary resilience of the elastomeric material. The reinforcement is conventionally an annular ring or band of rigid material embedded within the seat as the seat is molded. An example of such a valve seat is disclosed in U.S. Pat. No. 3,940,108, to Edwards.

Other valve seats made of an elastomeric material have been provided that are configured to control migration or creep by configuring the seat to increase sealing pressure as a result of the pressure applied to the seat on one side. For example, U.S. Pat. No. 4,331,319 to Summers et al. discloses a valve seat having a U-shaped cross-section which provides surfaces to enhance the sealing effectiveness of the valve as a result of line pressure, regardless of the direction of application. However, the U-shaped valve seat requires a special groove formed into the valve body in order to compensate for the specific U-shaped configuration. This groove requires additional machining to the valve body and may further introduce additional stresses on the body while requiring a thicker overall body. In addition, although the U-shaped valve seat provides for some flexibility and resiliency in the radial direction, that flexibility may be limited, causing the valve seat to wear substantially during use as the seat rubs against the disc during opening and closing cycles.

DISCLOSURE OF INVENTION

Various embodiments of the present invention are directed toward a valve seat and valve seat retainer for a butterfly valve in which the valve body may include a flat face or surface for receiving the valve seat and valve seat retainer. Furthermore, embodiments of valve seats of the present invention may be configured to provide increased resiliency and flexibility in the radial direction to reduce wear on the valve seat, while providing enhanced sealing effectiveness as a result of line pressure from either direction.

One embodiment of the present invention includes a butterfly valve seat. The valve seat may include an annular ring comprising a substantially S-shaped cross-section. The annular ring may include a plastic material. In another embodiment, the annular ring may include a first concave region and a second concave region. The first and second concave regions may be configured to open in opposing directions.

Other embodiments of the present invention include a butterfly valve seat retainer. The valve seat retainer may include an annular ring. The annular ring may include a first channel proximate the radially inward edge of the annular ring. A second channel may be positioned between the first channel and the radially inward edge of the annular ring. The depth of the first and second channels may have a depth sufficient to entirely receive a valve seat therein. A first protrusion may separate the first channel from the second channel. The height of the first protrusion may be less than the depth of the first and second channels. The second channel may be bound by a second protrusion, the height of the second protrusion being less than the height of the first protrusion. Furthermore, the radially inward edge of the second protrusion may form a portion of the radially inward edge of the annular ring.

Another embodiment of the present invention includes a butterfly valve. The butterfly valve may include a valve body that further includes a substantially circular flow channel. The valve body may also include a substantially flat surface extending radially outward from the flow channel. A disc may be rotatably mounted within the flow channel of the valve body and configured to rotate between a fully open position and a fully closed position. A valve seat comprising a plastic annular ring may include a cross-section of the valve seat having a substantially "S" shape. The valve seat may be positioned adjacent the substantially flat surface such that a radially inward portion of the valve seat contacts a circumferential sealing edge of the disc when the disc is in the fully closed position. A valve seat retainer may be positioned adjacent the substantially flat surface and may include an annular ring having at least one channel configured to receive the valve seat therein.

In yet another embodiment of the present invention, a fluid control system may include a butterfly valve comprising a valve body having a substantially circular flow channel and a substantially flat surface extending radially outward from the flow channel. A disc may be rotatably mounted within the flow channel of the valve body and may be configured to rotate between a fully open position and a fully closed position. A valve seat that includes a plastic annular ring comprising a cross-section having a substantially "S" shape may be positioned adjacent the substantially flat surface such that a radially inward portion of the valve seat contacts a radially outer surface of the disc when the disc is in the fully closed position. A valve seat retainer may be positioned adjacent the substantially flat surface and may include an annular ring comprising at least one channel configured to receive the valve seat therein. An actuator may be operably coupled to the disc and configured to rotate the disc.

DETAILED DESCRIPTION OF THE INVENTION

The illustrations presented herein are, in some instances, not actual views of any particular butterfly valve, valve seat, or seat retainer, but are merely idealized representations which are employed to describe the present invention. Additionally, elements common between figures may retain the same numerical designation.

Figure 1:
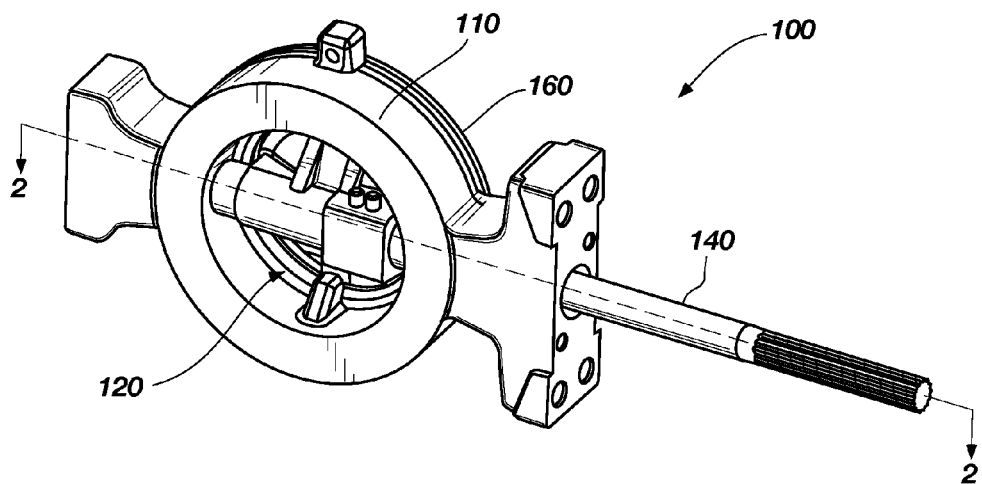
FIG. 1 illustrates a perspective view of a butterfly valve according to an embodiment of the present invention.
Figure 2:
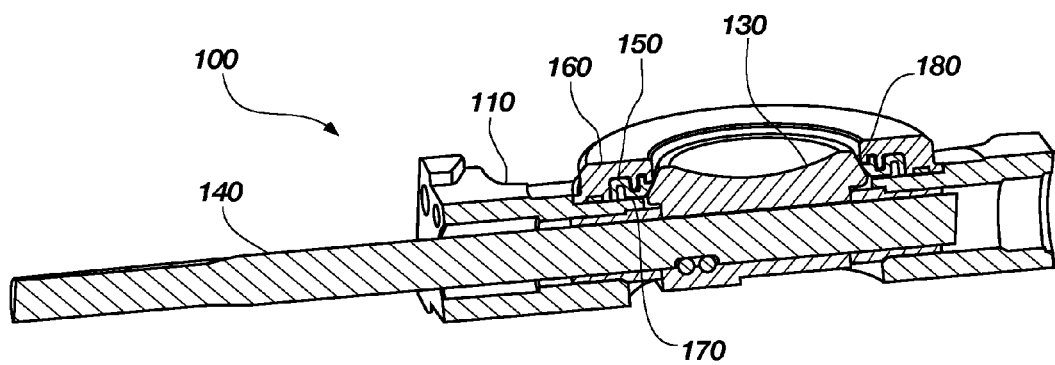
FIG. 2 illustrates a top sectional view of an embodiment of the butterfly valve of FIG. 1 through line 2-2.

FIG. 1 shows a perspective view of a butterfly valve 100 according to one embodiment of the present invention and FIG. 2 shows a cross-sectional top view through line 2-2 of FIG. 1. The butterfly valve 100 comprises a valve body 110 defining a flow channel 120 of substantially circular cross-section, a disc 130 mounted for rotation within the flow channel 120, a shaft 140 coupled to the disc 130 as is generally known in the art for rotating the disc 130, an annular valve seat 150, and a valve seat retainer 160.

The valve body 110 comprises a substantially circular opening defining the flow channel 120 configured to allow a fluid to flow therethrough. The valve body 110 may further comprise a substantially flat surface 170 (FIG. 3) extending radially outward from the flow channel 120. The disc 130 is rotatably mounted within the flow channel 120 of the valve body 110 and configured to rotate between a fully open position (when the disc 130 is positioned substantially parallel to the flow channel axis) and a fully closed position (when the disc 130 is positioned substantially perpendicular to the flow channel axis so that no fluid passes therethrough). Disc 130 may comprise a circumferential sealing edge 180, which is inclined with respect to the flow channel axis. The shaft 140 is coupled to the disc 130 and may extend outside of the valve body 110 so that rotation of the disc 130 may be controlled from outside the valve body 110, as is generally known in the art.

Figure 3:
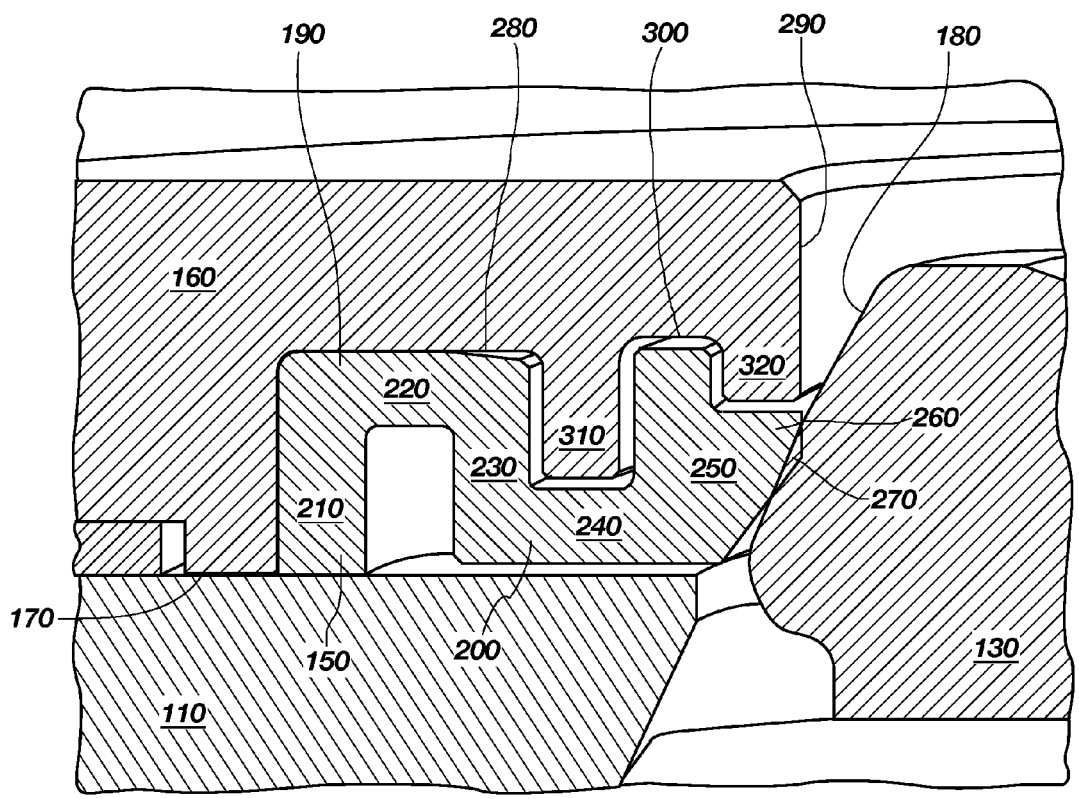
FIG. 3 shows a magnified partial section view of a valve seat and a valve seat retainer according to a particular embodiment of the invention.

FIG. 3 is a magnified partial section view of a valve seat 150 and a valve seat retainer 160 showing the cooperation between the valve body 110, the valve seat 150, the valve seat retainer 160 and the disc 130. The valve seat 150 may be positioned adjacent the substantially flat surface 170 of the valve body 110. The valve seat 150 may comprise an annular ring circumscribing the flow channel 120. The valve seat 150 may comprise a substantially S-shaped cross-section comprising a first concave region 190 and second concave region 200 configured to open in opposing directions. The valve seat 150 may comprise a plastic material, such as, by way of example and not limitation, an ultra high molecular weight polyethylene material. The S-shaped configuration provides improved compliance in the radial direction, allowing the valve seat 150 to conform and seal more effectively against the disc 130, as will be discussed in further detail below. Furthermore, this "S" shape may be capable of providing a relatively shorter valve seat, taken in the axial direction.

FIG. 3 shows the valve seat 150 in its totally undeflected position, i.e., in the position which it would occupy if the disc 130 was rotated into the open position, out of contact with the valve seat 150. The first concave region 190, comprising the radially outermost portion of the valve seat 150, may include a first leg 210, a first support segment 220, and a center leg 230. The first support segment 220 may extend radially inward from the first leg 210 and substantially perpendicular thereto. The center leg 230 may extend from the first support segment 220 in the same direction as the first leg 210 and substantially parallel thereto, the center leg 230 also being substantially perpendicular to the first support segment 220.

The second concave region 200, comprising the radially innermost portion of the valve seat 150, may comprise the center leg 230, a second support segment 240, and a second leg 250. The second support segment 240 may extend radially inward from the center leg 230 and substantially perpendicular thereto, the second support segment 240 extending substantially parallel to the first support segment 220. The second leg 250 may extend from the second support segment 240 in the same direction as the center leg 230 and substantially parallel thereto, the second leg 250 being substantially perpendicular to the second support segment 240.

The second leg 250 further comprises a sealing tab 260 extending radially inward and configured to contact the circumferential sealing edge 180 of the disc 130 when the disc 130 is in the closed position. The inside diameter of the valve seat 150, when unstressed, may be slightly smaller than the diameter of the disc 130. This dimensional relationship may ensure an interference fit, designated as the sealing point 270, between the sealing tab 260 and the circumferential sealing edge 180. The increased compliancy and spring effect in the radial direction provided by the S-shaped valve seat 150 coupled with the interference fit at the sealing point 270 enhance the sealing effectiveness of the valve seat 150, even at low line pressures. Furthermore, the sealing tab 260 may comprise an incline at the radially innermost edge. In some embodiments, the angle of the radially innermost edge below the sealing point 270 may be nearly parallel to circumferential sealing edge 180 of the disc 130. With an incline on the sealing tab 260, as the valve seat 150 wears, the surface area of the sealing point 270 in contact with the circumferential sealing edge 180 will increase, and the valve seat 150 will continue to seal. In addition, as discussed above, the "S" shape of the valve seat 150 may provide the seal with increased resiliency and compliance in the radial direction. Such an increased flexibility in the radial direction may allow more radial movement to compensate for wear of the valve seat 150, dimensional tolerances between the parts, and also for thermal expansion and contraction caused by different operating temperatures. Furthermore, the increased flexibility may create less friction forces between the disc 130 and the valve seat 150, and may, therefore, reduce wear of the valve seat 150.

The valve seat retainer 160 is positioned over the valve seat 150 and may include an annular ring configured to retain the valve seat 150 in position. The valve seat retainer 160 includes a flat surface configured to mate with the substantially flat surface 170 when the valve is assembled. The valve seat retainer 160 may include a first recess or channel 280 formed proximate a radially inward edge 290, and a second recess or channel 300 formed between the first channel 280 and the radially inward edge 290. The first channel 280 may be configured to substantially receive the first concave region 190 of the valve seat 150. Similarly, the second channel 300 may be configured to substantially receive at least a portion of the second leg 250 of the valve seat 150. The depths of the first channel 280 and the second channel 300 are configured to sufficiently receive the valve seat 150, such that portions of the valve seat 150 may lie adjacent the substantially flat surface 170 of the valve body 110. In some embodiments, the first channel 280 and the second channel 300 may have substantially similar depths. This may allow for a valve body 110 that does not require any substantial groove to receive a portion of the valve seat 150, which groove may generally require a thicker body. In addition, the lack of a groove in the valve body 110 may provide a body which is more structurally sound.

Located between the first channel 280 and the second channel 300 is a first retaining tooth or protrusion 310. The first protrusion 310 may be positioned and configured to extend at least partially into a portion of the second concave region 200 of the valve seat 150. The length or height of the first protrusion 310 may be less than the depths of the first channel 280 and the second channel 300 to allow adequate space for the second support segment 240 between the first protrusion 310 and the substantially flat surface 170 of the valve body 110. A second retaining tooth or protrusion 320 may be positioned adjacent the radially inward edge 290. The second protrusion 320 may form a radially inward boundary of the second channel 300 and may be configured to circumscribe an outer surface of the radially inward edge of the second leg 250 of the valve seat 150. The valve seat retainer 160 may comprise any suitable metal material.

The first and second protrusions 310, 320, respectively, may further provide retention features to help retain the valve seat 150 in the valve seat retainer 160. These retention features may also limit the movement of the valve seat 150 and prevent excessive deflection which, in turn, may lead to plastic yielding. For example, the second protrusion 320 may retain the second leg 250, extending into the second channel 300, from excessively deflecting. Without such features, pressure differentials across a partially closed valve may deflect the valve seat 150 downstream and radially inward, or the seat may catch onto the disc 130 when it is rotating and be pulled out of the valve seat retainer 160. When the disc is distorted or pulled out of the valve seat retainer 160, closing the disc 130 may bend the valve seat 150 backwards or even invert it, causing damage to the valve seat 150 and severe leakage.

In some embodiments, the valve seat 150 may be press-fit into the valve seat retainer 160. An interference fit may be provided between that radially outermost edge of the first leg 210 and the relative mating surface of the valve seat retainer 160, depicted as surface 350. Such an interference fit may positively align the valve seat 150 to the valve seat retainer 160. With the valve seat 150 positioned and fit into the valve seat retainer 160, the valve seat retainer 160 may be positioned adjacent to the substantially flat surface 170 of the valve body 110. Before the valve seat 150 and valve seat retainer 160 are secured in position, the valve seat retainer 160 may be allowed to float or move to center itself as a unit around the disc 130 rotated to its closed position. After the valve seat 150 and valve seat retainer 160 are positively aligned with the disc 130, the valve seat retainer 160 may be secured in place adjacent the substantially flat surface 170.

When the valve seat 150 and valve seat retainer 160 are secured in place, the first leg 210 of the valve seat 150 may be clamped or compressed between the substantially flat surface 170 and the first channel 280 of the valve seat retainer 160 to further secure the valve seat 150 in place. The compressed first leg 210 may also create a seal between the valve seat retainer 160 and valve body 110 to prevent fluid from leaking around the outside of the valve seat 150. The first leg 210, therefore, may comprise a length which is greater than the depth of the first channel 280 to create the interference fit.

Figure 4:
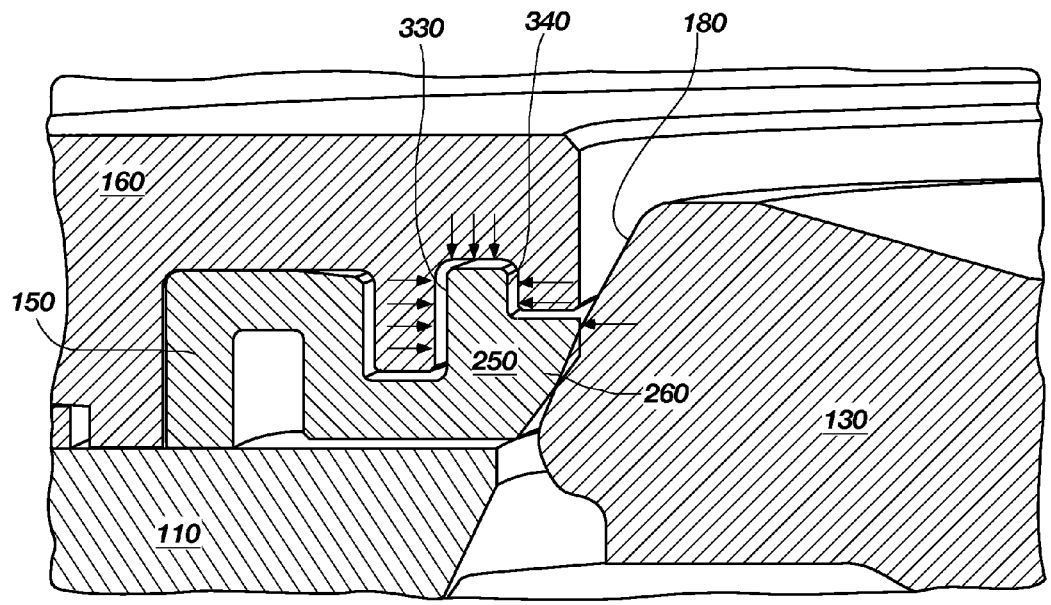
FIG. 4 illustrates the pressures on the valve seat of FIG. 3 with a fluid flow in which the shaft is downstream.

In addition to providing the valve seat 150 with increase resilience and compliance in the radial direction, the "S" shape of the valve seat 150 may also improve the bi-directional pressure assisted sealing characteristics. Conventionally, when closed and pressurized, inline fluid pressure is applied to both the valve seat and the disc. In embodiments of the present invention, this inline pressure enhances the sealing effectiveness, regardless of whether the valve is pressurized from flow with the shaft 140 upstream or downstream. FIG. 4 illustrates the pressures on the valve seat 150 according to one embodiment with a fluid flow in which the shaft 140 is downstream. In other words, the fluid flow is from top to bottom of the valve, as the valve is oriented in FIG. 4. With increased pressure applied from a flow with the shaft 140 downstream, the disc 130 axially deflects in the downstream direction. The "S" shape of the valve seat 150 is such that unbalanced areas exposed to the pressure result in a sealing stress which increases proportionally to the pressure differential. More specifically, when pressure is applied to the valve seat 150 with the shaft 140 downstream, pressure may be applied on the valve seat 150 in the directions of the arrows as a result of fluid flow in the spaces between the valve seat 150 and the valve seat retainer 160. The surface area of the radially outward surface 330 of the second leg 250 may be larger than the combined surface area of the radially inward surface 340 of the second leg 250 and the exposed surface of the sealing tab 260. The valve seat 150 may, therefore, be deflected both downstream and radially inward into the circumferential sealing edge 180 of the disc 130 to a degree greater than the above-mentioned deflection of the disc 130. This deflection of the valve seat 150 may enhance the sealing effectiveness of the valve.

Figure 5:
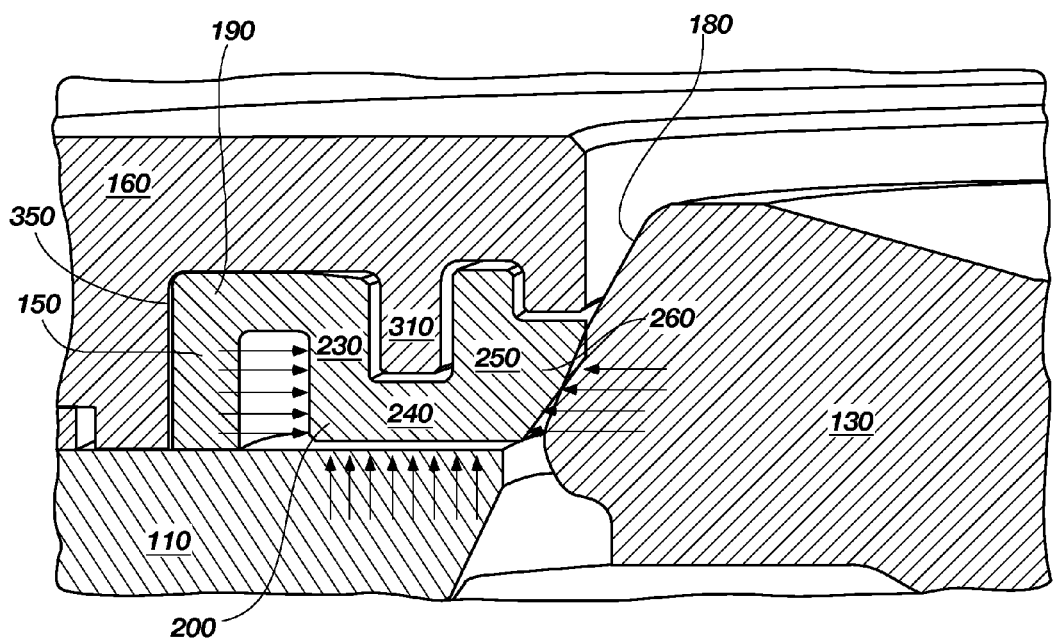
FIG. 5 illustrates the pressures on the valve seat of FIG. 3 with a fluid flow in which the shaft is upstream.

FIG. 5 illustrates the pressures on the valve seat 150 according to one embodiment with a fluid flow in which the shaft 140 is upstream from the fluid flow. In other words, the fluid flow is from bottom to top of the valve, as the valve is oriented in FIG. 5. With increased pressure applied to the shaft side of the valve, a two-fold stress-versus-deflection phenomenon may occur in the valve seat 150. The disc 130 may displace axially in the downstream direction. The axial displacement of the disc 130 may increase the elastic internal stresses in the valve seat 150 by virtue of a compression on the valve seat 150 between the circumferential sealing edge 180 and the surface 350 at the radially outer most edge the valve seat retainer 160. Furthermore, when pressure is applied to the valve seat 150 with the shaft 140 upstream, pressure may be applied to the radially outer surface of the center leg 230, the upstream surface of the second support segment 240, and the exposed surface of the sealing tab 260 in the direction of the arrows as a result of fluid flow in the spaces between the valve seat 150 and the valve body 110. The surface area of the radially outer surface of the second support segment 240 may be larger than the surface area of the exposed surface of the sealing tab 260, resulting in a net force pushing the valve seat 150 both downstream and into the disc 130. These forces tend to increase proportionally with the fluid pressure. Additionally, the deflection of the valve seat 150 downstream, combined with the pressures on the second concave region 200, may cause the second concave region 200 to bend around the first protrusion 310 of the valve seat retainer 160, creating essentially compressive stresses on the downstream surface of the second support segment 240 and tensile stresses on the upstream surface of the second support segment 240. These stresses tend to increase proportionately with disc deflection. These actions may enhance the sealing effectiveness of the valve.

Figure 6:
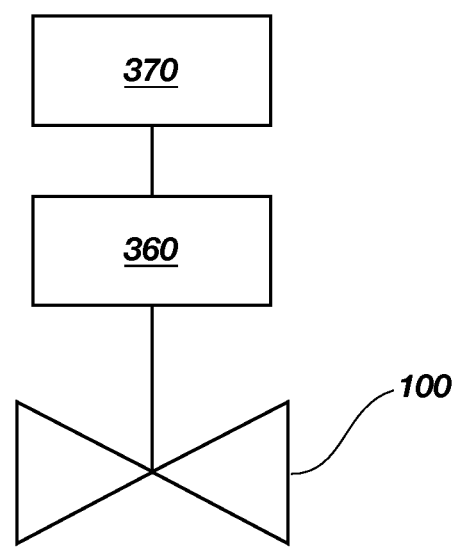
FIG. 6 is a system diagram of a fluid control system according to one embodiment of the present invention comprising a butterfly valve.

FIG. 6 is a system diagram of a fluid control system according to one embodiment of the present invention comprising a butterfly valve 100. The butterfly valve may include a butterfly valve 100 of the present invention as previously described. More particularly, the butterfly valve 100 may include a valve body and a disc rotatably secured within the valve body. A valve seat may be coupled to the valve body with a valve seat retainer. The valve seat 150 and the valve seat retainer 160 may be configured according to an embodiment, as described above. An actuator 360 may be controllably coupled to the shaft 140 and configured to control the rotation of the disc 130. The actuator 360 may comprise any conventional actuator known in the art. By way of example and not limitation, the actuator 360 may comprise a Valtek-brand actuator, available from Flowserve Company of Irving, Tex. A positioner 370 may be operably coupled to the actuator 360. The positioner 370 may comprise any conventional positioner 370 as is known in the art. By way of example and not limitation, the positioner 370 may comprise a Valtek-brand positioner, available from Flowserve Company of Irving, Tex.

While certain embodiments have been described and shown in the accompanying drawings, such embodiments are merely illustrative and not restrictive of the scope of the invention, and this invention is not limited to the specific constructions and arrangements shown and described, since various other additions and modifications to, and deletions from, the described embodiments will be apparent to one of ordinary skill in the art. Thus, the scope of the invention is only limited by the literal language, and equivalents, of the claims which follow.

What is claimed is:

1. A butterfly valve seat retainer comprising:
a valve seat retainer body having an annular ring formed therein for receiving a valve seat therein, the valve seat retainer body configured to be positioned opposing a shaft of a butterfly valve, the annular ring comprising:
a first channel proximate a radially inward edge of the annular ring; and
a second channel between the first channel and the radially inward edge of the annular ring, wherein a depth of the first channel and a depth of the second channel are configured to receive an entire valve seat therein;
the first channel separated from the second channel by a first protrusion, wherein a height of the first protrusion is less than the depth of the first and second channels;
the second channel bound by a second protrusion, wherein the height of the second protrusion is less than the height of the first protrusion, and wherein the radially inward edge of the second protrusion forms a portion of the radially inward edge of the annular ring.

2. The butterfly valve seat retainer of claim 1, wherein the depth of the first channel is substantially equal to the depth of the second channel.

3. A butterfly valve comprising:
a valve seat comprising an annular ring comprising first and second concave regions, the first and second concave regions configured to open in opposing directions and the second concave region being radially inward relative to the first concave region;
a valve seat retainer comprising:
a first channel formed proximate a radially inward edge of the valve seat retainer; and
a second channel formed between the first channel and the radially inward edge of the valve seat retainer, wherein the first channel is larger than the second channel, and wherein the first concave region is received within the first channel of the valve seat retainer and a portion of the second concave region is received within the second channel of the valve seat retainer; and
a valve body comprising a substantially flat surface, wherein the valve seat and the valve seat retainer are positioned on the substantially flat surface of the valve body, and wherein the substantially flat surface of the valve body extends along a majority of the first and second concave regions of the valve seat.

4. The butterfly valve of claim 3, wherein the valve seat retainer further comprises:
a first protrusion positioned between the first channel and the second channel, the first protrusion comprising a height less than the depth of the first and second channels; and
a second protrusion between the second channel and the radially inward edge, a radially inward edge of the second protrusion comprising a portion of the radially inward edge of the valve seat retainer, the second protrusion comprising a height less than the height of the first protrusion.

5. A butterfly valve, comprising:
a valve body comprising a substantially circular flow channel and a substantially flat surface extending radially outward from the flow channel;
a disc rotatably mounted on a shaft within the flow channel of the valve body and configured to rotate between a fully open position and a fully closed position, wherein the valve body is positioned on a first side of the disc proximate the shaft;
a valve seat comprising a plastic annular ring, a cross-section of the valve seat comprising a substantially "S" shape, the valve seat positioned adjacent the substantially flat surface such that a radially inward portion of the valve seat contacts a circumferential sealing edge of the disc when the disc is in the fully closed position; and
a valve seat retainer positioned on a second side of the disc opposing the first side of the disc and the shaft and adjacent the substantially flat surface of the valve body, the valve seat retainer formed as an annular ring comprising:
a first channel formed proximate a radially inward edge of the annular ring;
a second channel formed between the first channel and the radially inward edge of the annular ring, wherein the first channel and the second channel are configured to receive the valve seat therein:
a first protrusion positioned between the first channel and the second channel, the first protrusion comprising a height less than the depth of the first and second channels; and
a second protrusion between the second channel and the radially inward edge, a radially inward edge of the second protrusion comprising a portion of the radially inward edge of the annular ring, the second protrusion comprising a height less than the height of the first protrusion.

6. The butterfly valve of claim 5, wherein the valve seat comprises an ultra high molecular weight polyethylene.

7. The butterfly valve of claim 5, wherein the substantially S-shaped cross-section of the valve seat comprises:
- a first leg positioned at and comprising a radially outermost edge;
- a first support segment extending radially inward from the first leg and substantially perpendicular thereto;
- a center leg extending from the first support segment in the same direction as the first leg and substantially parallel to the first leg;
- a second support segment extending radially inward from the center leg and substantially perpendicular thereto; and
- a second leg extending from the second support segment in the same direction as the center leg and substantially parallel to the second leg.

8. The butterfly valve of claim 7, wherein the second leg further comprises a sealing tab extending radially inward from the second leg and configured to contact the circumferential sealing edge of the disc.

9. The butterfly valve of claim 8, wherein the sealing tab comprises an incline at a radially innermost edge.

10. A fluid control system, comprising:
- the butterfly valve of claim 5; and
- an actuator operably coupled to the disc and configured to rotate the disc in the flow channel.

11. The fluid control system of claim 10, further comprising a positioner controllably coupled to the actuator.

* * * * *

UNITED STATES PATENT AND TRADEMARK OFFICE
CERTIFICATE OF CORRECTION

PATENT NO. : 8,714,521 B2  
APPLICATION NO. : 13/001367  
DATED : May 6, 2014  
INVENTOR(S) : Michael P. Nelson and Laren J. Winkel Page 1 of 1

It is certified that error appears in the above-identified patent and that said Letters Patent is hereby corrected as shown below:

On the title page:
In ITEM (56) References Cited
  FOREIGN PATENT DOCUMENTS
    PAGE 2,    COLUMN 1,   LINE 15      Add --JP   2007170616   7/2007--

Signed and Sealed this
Thirteenth Day of October, 2015

Michelle K. Lee
*Director of the United States Patent and Trademark Office*